United States Patent Office 2,950,377
Patented Aug. 23, 1960

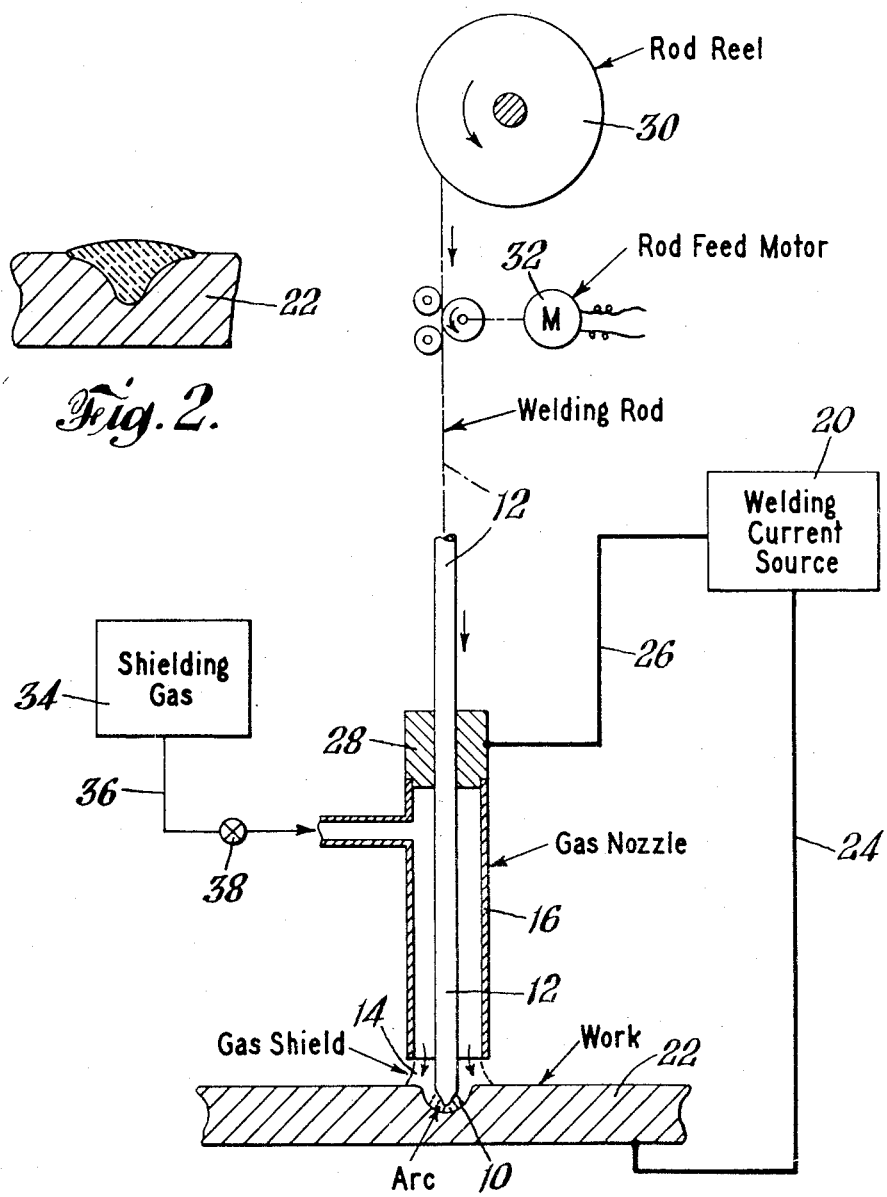

2,950,377

METAL ARC WELDING

Kenneth L. Thomas, Indianapolis, Robert J. Wickham, Plainfield, and George M. Skinner, Indianapolis, Ind., assignors to Union Carbide Corporation, a corporation of New York Original application Sept. 1, 1954, Ser. No. 453,476, now Patent No. 2,863,981, dated Dec. 9, 1958. Divided and this application July 25, 1958, Ser. No. 751,009

6 Claims. (Cl. 219—74)

This invention relates to gas shielded metal arc welding and more particularly to such welding according to Muller et al. 2,504,868 and Kennedy 2,532,410, which is referred to below as sigma welding.

The sigma welding process requires no flux and normally utilizes an inert gas such as argon or helium to shield a consumable metal electrode arc. These gases, however, have the disadvantage of being relatively expensive. If such inert gases could be replaced even partly with inexpensive carbon dioxide, for example, operating costs could be lowered and enable the sigma welding process to be more favorably competitive with the coated-electrode metal-arc welding process in the fabrication of carbon steels, stainless steels and nickel base alloys, for example.

The present invention is concerned with using commercially pure carbon dioxide mixed with oxygen as the shielding gas for sigma welding such metals without the use of any flux. In addition to being less expensive, the use of carbon dioxide in such mixture with oxygen, according to our invention, produces the following advantages: Higher voltage (arc), increased welding speed, deeper penetration, and improved cross-sectional shape of the weld nugget. The welding speed has been increased in some cases as much as 100%, i.e., from 25 to 50 inches per minute by our invention. The welding area cross section has been improved for single-pass welds due to the deeper penetration.

Spatter is substantially reduced, according to our invention, by the use of a novel ultra-short or sunken arc technique. By ultra-short arc length we mean an arc that is substantially shorter than that known to the prior art as a short arc. Our ultra-short arc length is maintained by suitable means, preferably by a constant potential source of welding current. The effect of this novel technique is a substantial reduction of spatter and increase in penetration.

Porosity is kept to a minimum by the use of welding wire composed of deoxidized carbon steel containing residual deoxidizers. With such deoxidized wire, killed steel welded according to the invention is entirely free of porosity and porosity is minor in semi-killed steel work.

In the drawing:

Fig. 1 is a circuit diagram illustrating the invention; and

Fig. 2 is a cross-sectional view of a weld made according to the invention.

As shown, an ultra-short or sunken, deep cratered arc 10 is struck between the end of an electrode in the form of bare welding wire or rod 12 under a stream 14 of gas composed of a mixture of $CO_2$ and $O_2$ that is discharged from a gas cup or nozzle 16, so that such gas protects the arc and adjacent metal from the air. The visible length of such arc preferably should be not more than about 1/16 of an inch and may actually be hidden in the crater below the surface of the base plate. The arc is energized by a suitable welding current source 20 that is connected to an electrode in the form of work 22 by a lead 24, and to the rod 12 by a lead 26 and a contact tube 28. As the end of the electrode 12 is fused by the arc, such electrode is drawn from a rod reel 30 and fed toward the arc by means including a rod feed motor 32. $CO_2$ gas is supplied to the nozzle 16 from a suitable source 34 of such gas, under pressure, through a pipe 36 containing a valve 38. In the case of seam welding the arc 10 and the work 22 are moved relatively to each other in the direction of the seam.

The experimental work has performed with a Linde Company FSM-1, series 2, sigma welding machine using manually-adjusted constant rod feed rate with No. 32 CMS wire (marketed by the Linde Company, Division of Union Carbide Corporation, and consisting of deoxidized metal composed of 0.15% C maximum, 0.25–0.35% Cr, 1.00–1.20% Mn, 0.20–0.30% Si, trace—0.015% S, trace—0.04% P, and the balance iron) on 1/4-inch thick carbon steel plates. The shielding gas flow rate through a No. 12 gas cup was varied from 55–83 c.f.h. The welding conditions were established for two-pass welds; i.e., one weld bead on each side of the joint to be welded with about 60% penetration in each pass. The tests were made with beads obtained by welding on a solid workpiece. The test work was verified on actual butt welds without plate edge preparation. Most of the work was done on degreased cold finished steel strip and the rest on hot-rolled steel strip that had been descaled with acid.

One technique for reducing the degree of spatter and arc instability associated with high percentages of $CO_2$ involves utilization of our novel extremely short arc length (approximately 1/16-inch). Such short arc length is preferably maintained by the use of a constant potential power source such as that disclosed by the Kennedy patent referred to above. The use of constant potential power increases the stability of ultra-short arcs. The criticality of arc length maintenance is inversely proportional to the length of the arc used for welding. This not only reduces the amount of spatter but apparently changes the phenomenon of its formation. The short-arc technique, which is preferably used at high welding speeds (150 i.p.m.) on steel, gives a "sparkler" type of spatter which apparently oxidizes readily and does not congest the cup or appreciably deposit on the base metal.

The term bare electrode or wire as used herein includes those containing a so-called wash coating.

Mixtures of $CO_2$ and 5% $O_2$, 10% $O_2$, 20% $O_2$ and even 50% $O_2$ were successfully employed according to our invention for welding killed steels.

The present application is a division of our application Serial No. 453,476, filed September 1, 1954, now Patent No. 2,863,981, granted December 9, 1958.

We claim:

1. Sigma welding carbon steel in which the welding arc and adjacent metal are shielded from the air by an arc shielding atmosphere composed of a mixture of carbon dioxide and oxygen in which the latter is between 5% and 50% thereof with a bare metal electrode composed of deoxidized carbon steel containing residual deoxidizers.

2. Sigma welding killed carbon steel in a stream composed of a mixture of carbon dioxide gas and oxygen in which the latter is between 5% and 50% thereof.

3. Process of metal arc welding carbon steel without the aid of flux which comprises the steps of connecting deoxidized carbon steel welding wire containing residual deoxidizers and work to a suitable source of welding current, striking a welding arc between such wire and work, feeding the wire rapidly toward such arc, the current supplied to said arc by such source being sufficient to fuse and transfer metal from the end of the wire to the work to form on the latter a weld puddle, passing an annular stream composed of a mixture of 5% to 50% oxygen, the balance carbon dioxide gas, along the end portion of the so fed wire to shield such end portion, the welding arc, puddle and adjacent work metal from the air, and maintaining an ultra-short arc length between the bottom of such puddle and the end of said wire.

4. Process as defined by claim 3, in which such ultra-short arc length is maintained by means of a constant potential source of welding current.

5. Process of making porosity-free welds in low carbon steel metal work without the aid of flux, which comprises flowing an annular stream of commercially pure carbon dioxide gas containing 5% to 50% oxygen along the end portion of a bare wire composed of deoxidized carbon steel containing residual deoxidizer material, striking a welding arc between the end of such wire and the work, fusing the metal thereof, forming a puddle of molten metal in the work under such arc, feeding the wire toward the arc at a rate such that fused metal is transferred from the end of the wire through an ultra-short arc and moving the work and wire relatively to each other in the direction of a path to be welded, while maintaining such gas flow and such arc length.

6. Sigma welding with a shielding gas composed of a mixture of only carbon dioxide and up to 50% of oxygen.

References Cited in the file of this patent

UNITED STATES PATENTS

| | | |
|---|---|---|
| 2,824,948 | Willigen et al. | Feb. 25, 1958 |

FOREIGN PATENTS

| | | |
|---|---|---|
| 786,650 | Great Britain | Nov. 20, 1957 |
| 791,347 | Great Britain | Feb. 26, 1958 |
| 791,974 | Great Britain | Mar. 19, 1958 |